OPEN FLUX MEMORY WITH SENSING PLANE

Filed May 20, 1964 4 Sheets-Sheet 1

INVENTORS E. M. GYORGY
F. B. HAGEDORN
BY Herbert M. Shapiro
ATTORNEY

"1"

"0"

United States Patent Office 3,381,283
Patented Apr. 30, 1968

3,381,283

OPEN FLUX MEMORY WITH SENSING PLANE

Ernst M. Gyorgy, Morris Plains, and Fred B. Hagedorn, Berkeley Heights, N.J., assignors to Bell Telephone Laboratories, Incorporated, New York, N.Y., a corporation of New York Filed May 20, 1964, Ser. No. 368,944
5 Claims. (Cl. 340—174)

ABSTRACT OF THE DISCLOSURE

The sense line common to magnetic memories organized on a random access basis is replaced by a pair of conducting sense planes between which a detector is connected. The memory plane is positioned between the sense planes. When a bit location in the memory plane is switched, eddy currents are induced in the memory planes for detection.

This invention relates to information storage circuits and, more particularly, to information storage circuits including a memory plane comprising an open flux structure.

In this connection, the term "open flux" characterizes a structure wherein magnetic flux switched within a portion of the structure closes through the air thereabout. Such structures as, for example, an open-flux "twistor" memory, an open-flux "tensor" memory, a ferromagnetic thin-film memory, and some superconducting thin-film memories, accordingly, are suitable structures in accordance with this invention. All these structures are well known in the art.

Typically, memories including bit-organized memory planes comprising any open or closed flux structure require a single sense conductor coupled to every bit location in the memory plane. The provision of such a sense conductor is relatively costly. For large memories, however, not only is the cost of such a conductor a significant consideration, but also, there are additional problems. The primary problem is that the conductor becomes so long for large memories that a considerable delay results between a memory-read pulse and a corresponding sense output pulse. Thus, it is difficult to produce high speed memories utilizing large, bit-organized memory planes. An associated problem is that the resistance of the conductor increases as its length increases; the higher the resistance, the lower the amplitude of the sense output pulse.

Accordingly, a primary object of this invention is to provide a new and novel high speed memory including a bit-organized memory plane.

Another object of this invention is to provide a simple and inexpensive means for sensing information in memories including bit-organized memory planes.

These and further objects of this invention are realized in one embodiment thereof wherein row and column conductors define a matrix of bit locations on an adjacent superconductive memory plane. A second superconductive plane is positioned to the side of the memory plane opposite the row and column conductors. A voltage pulse detector is connected between the two superconductive planes. In response to a memory-read pulse, interrogating a single bit location, a voltage pulse is exhibited by the voltage pulse detector.

In another embodiment of this invention, row and column conductors overlie a matrix of bit locations on a ferromagnetic thin-film memory. An electrically conducting plane is positioned adjacent each side of the thin-film memory plane. A voltage pulse detector connected between the two electrically conducting planes exhibits an output pulse in response to a memory-read pulse interrogating a single bit location.

Thus, in accordance with one embodiment of this invention, a feature thereof is a superconductive sense plane adjacent an open-flux superconductive memory plane, and voltage pulse detector connected therebetween.

In accordance with another embodiment of this invention, a feature thereof is an electrically conducting sense plane adjacent each side of a ferromagnetic thin-film open-flux memory plane, and a voltage pulse detector connected therebetween.

The invention and its further objects and features will be understood more fully from the following description rendered in conjunction with the accompanying drawing wherein.

Figure 1:
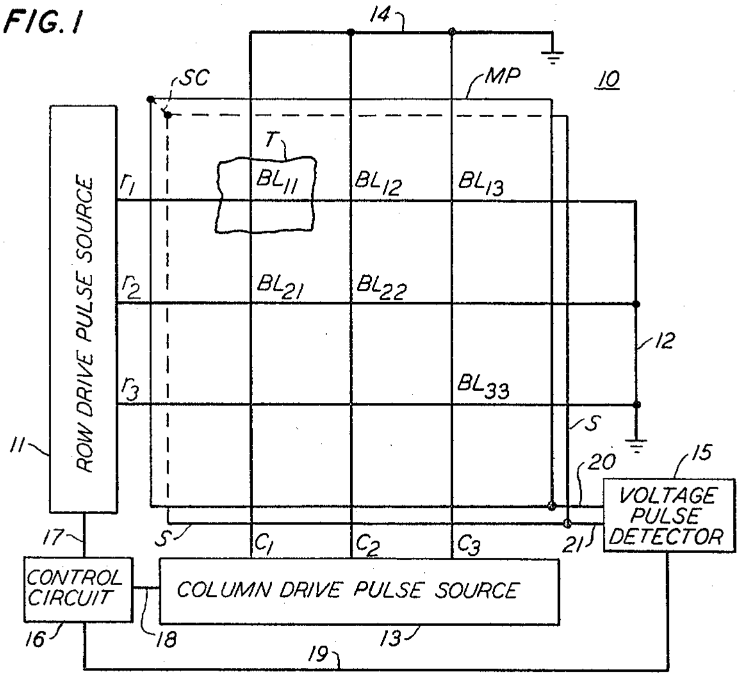
FIG. 1 is a schematic representation of a bit-organized superconductive memory in accordance with this invention.

It is to be understood that the figures are not necessarily to scale, certain dimensions thereof having been exaggerated for purposes of illustration.

The first embodiment to be described herein employs the phenomenon of "superconductivity." It will be helpful to recall some of the properties of superconductive materials and their use to understand better the description to follow.

The term "superconductivity" characterizes the ability of certain normally resistive materials to exhibit zero resistance to the flow of an electrical current when cooled to sufficiently low temperatures. The temperature at which this transition occurs is known as the transition temperature and is characteristic of the particular superconducting material employed. For example, the transition temperature of tantalum is 4.4 degrees Kelvin (° K.), lead 7.3° K. and niobium 9.3° K. In all, there are about twenty-five elements in addition to hundreds of alloys and compounds which become superconducting at temperatures ranging between 0 and 18° K. It is contemplated that the following superconductive memory circuit operates in this range, and equipment for maintaining suitable temperatures is assumed present. The well known liquid helium cryostat is particularly well adapted for this purpose.

The normal transition temperature of a given superconducting material is lowered in the presence of a magnetic field. If a constant temperature is maintained, a magnetic field of sufficient intensity causes the superconducting material to revert to its normal resistive state. Similarly, currents in excess of a critical value, termed the "critical current," also cause the superconducting material to revert to its normal resistive state.

Superconducting materials provide useful memories because first and second binary values may be stored therein as first and second directions of persistent currents. These currents are conveniently stored in a superconducting memory in a coincident current mode by applying half-select write current pulses to selected row and column conductors. The field of the drive currents cannot penetrate the superconductor which generates therein supercurrents to oppose the change in field. The write current pulses, however, are chosen of sufficient amplitude to generate a field opposed by supercurrents which are initially in excess of the critical current. Thus, the superconductor is driven resistive at the selected bit location.

At the termination of the write pulses, the superconducting state is already reestablished and persistent currents are circulating in the superconductor in a direction determined by the polarity of the write pulses. As is described in detail hereinafter in connection with the superconductive embodiment of this invention, positive write pulses providing persistent currents in a first direction are taken, arbitrarily, as corresponding to a binary "1"; negative write pulses providing persistent currents in a second direction are taken, arbitrarily, as corresponding to a binary "0." One such superconducting memory is described on page 427 et seq. of "Large-Capacity Memory Techniques for Computing Systems," edited by M. C. Yovits, published in 1962 by The MacMillan Co., New York. The operation of such memories depends on selectively driving resistive bit locations of a superconducting memory plane for coupling a sense conductor on the opposite side of the memory plane to the row and column conductors via the field generated thereabout during a read cycle of operation. In terms of the present embodiment, a superconducting sense plane adjacent the memory plane causes the persistent currents at a selected bit location therein to distribute throughout the memory plane and further acts as a flux guide for the flux associated with the persistent currents. In this manner, changes in the persistent currents when a binary "1" is read out of a selected bit location are accompanied by changes in the magnetic field between the memory plane and the sense plane and, consequently, at the periphery of the memory plane where the changes are detected while minimizing the aforementioned problems.

FIG. 1 shows a bit-organized, coincident-current memory 10 comprising a superconductive memory plane MP to which access is had via row conductors $r_1$, $r_2$, and $r_3$, and column conductors $c_1$, $c_2$, and $c_3$. Each of the row conductors is connected between row drive pulse source 11 and ground bus 12. Similarly, each of the column conductors is connected between column drive pulse source 13 and ground bus 14. The row and column conductors are, illustratively, positioned generally orthogonal to each other and define at the intersections a matrix of bit locations $BL_{11}$, $BL_{12}$, $BL_{13}$, $BL_{21}$, $BL_{22}$ . . . $BL_{33}$ in the memory plane MP. Although only nine bit locations are illustated, it is to be understood that a lesser or greater number of bit locations may be utilized. A sense plane S, comprising superconducting material, is positioned adjacent the memory plane in a manner to couple each of the bit locations of the memory plane. A voltage pulse detector 15 is connected to the memory plane and to the sense plane via conductors 20 and 21, respectively. A conductor SC is connected between the memory plane and the sense plane at a position spaced apart from that to which the voltage pulse detector is connected, providing a short circuit between the memory plane and the sense plane there. Row drive pulse source 11, column drive pulse source 13, and voltage pulse detector 15 are connected to a control circuit 16 via conductors 17, 18, and 19, respectively.

Figure 2:
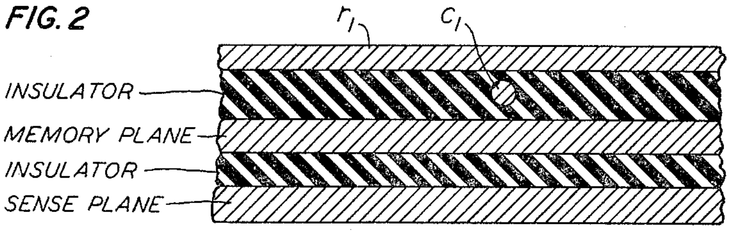
FIG. 2 is a cross-sectional view of a representative bit location of the memory of FIG. 1.

In accordance with this invention, the superconductive sense plane S and the row and column conductors are positioned on opposite sides of the memory plane for reasons which will become apparent hereinafter and which are consistent with prior art superconducting memories. This spatial arrangement is shown in FIG. 2 which is a cross section of the memory 10 of FIG. 1 taken along the row conductor $r_1$ at the bit location $BL_{11}$. The figure also illustrates the separation of the access conductors *r* and *c*, the same plane S, and the memory plane MP by insulating materials designated I*ns* in the figure. The memory plane is fabricated by well known deposition techniques which result in the various planes and conductors being in close proximity to one another. Such deposition techniques are well understood in the art and do not constitute a part of this invention. Likewise, the relative dimensions of the various conductors and planes described are within well recognized limits. These considerations, accordingly, are not discussed further.

Figure 3:
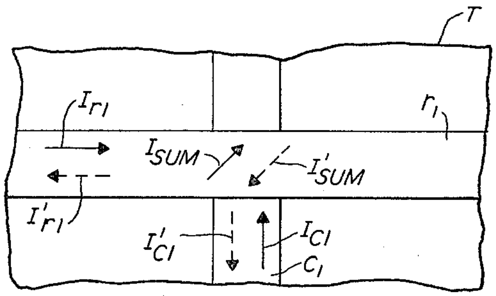
FIGS. 3 and 5 are top views of the representative bit location of FIG. 2 showing the directions of currents applied to the access conductors there and the supercurrents generated in the bit location in response thereto.

In accordance with this invention, coincident half-select pulses are applied, for example, to row conductor $r_1$ and column conductor $c_1$ for storing persistent currents in representative bit location $BL_{11}$. To this end, pulse sources 11 and 13 are any pulse sources capable of energizing the row and column conductors in accordance with this invention. Activation of the pulse sources 11 and 13 is under the control of control circuit 16 which, for this purpose, is any control circuit capable of energizing the pulse sources 11 and 13 in accordance with this invention. As is stated hereinbefore, a binary "1" is considered stored when positive half-select pulses are applied. The direction of positive currents in the drive conductors is outward from the pulse source as viewed in FIG. 1. This is more clearly illustrated by the arrows $I_{r1}$ and $I_{c1}$ in FIG. 3 which shows enlarged the portion T of FIG. 1 encompassing bit location $BL_{11}$. The two positive half-select (in accordance with the parlance of coincident-current memories) currents add vectorially to produce a "full-select" pulse $I_{sum}$ directed upward and to the right as viewed in FIG. 3. Opposing the magnetic field of these current pulses are currents generated in the bit location $BL_{11}$ as is well known. These opposing currents are shown as broken arrows designated $I'_{r1}$, $I'_{c1}$, and $I'_{sum}$ in FIG. 3. The full-select pulse $I_{sum}$ which is herein also termed the "write 1" pulse is chosen to be of a value to drive the superconducting material at the bit location $BL_{11}$ resistive.

Figure 4:
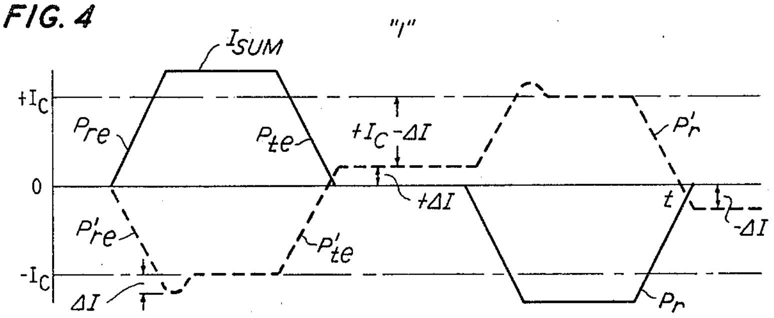
FIGS. 4 and 6 are pulse diagrams illustrating, in connection with the memory of FIG. 1, the current conditions in the access conductors and in the representative bit location in response thereto.

The applied full-select pulse $I_{sum}$ and its effect on the bit location may best be understood with reference to FIG. 4. In FIG. 4, current I is plotted against time *t*. Critical currents $\pm I_c$ are denoated as horizontal broken lines. For two positive half-select pulses, the write pulse rises from zero to a value exceeding $+I_c$. Opposing currents are generated in the bit location as shown by broken line $P'_{re}$ which designates the rising edge of the opposing supercurrent pulse. The rising edge of the write "1" pulse is designated $P_{re}$. The opposing currents in the superconductor cannot exceed the critical current value $\pm I_c$ which is characteristic of the superconducing material without the superconducting material becoming resistive. Accordingly, for currents $-(I_c+\Delta I)$ slightly exceeding this value $-I_c$ as shown in FIG. 4, the material becomes resistive and the currents therein undergo a change in distribution; the current $-(I_c+\Delta I)$ decays promptly to the value $-I_c$ as shown in FIG. 4 (neglecting heating effects). The trailing edge $P_{te}$ of the write "1" pulse decays from the maximum value greater than $+I_c$ to zero. The change in the accompanying magnetic field is opposed by changes in the supercurrents as shown by the trailing edge $P'_{te}$ of the supercurrent pulse. The trailing edge $P'_{te}$ of the supercurrent pulse, however, decreases from a maximum value of $-I_c$. Accordingly, although the trailing edge $P_{te}$ terminates at zero, the trailing edge $P'_{te}$ terminates at a positive value approximately equal to the excess current $\Delta I$ and is so designated in the figure. This current is known as a persistent current and manifests itself as a current in bit location $BL_{11}$ circulating in a positive direction. This direction is the "first direction" as called for hereinbefore and corresponds to a binary "1."

Figure 5:
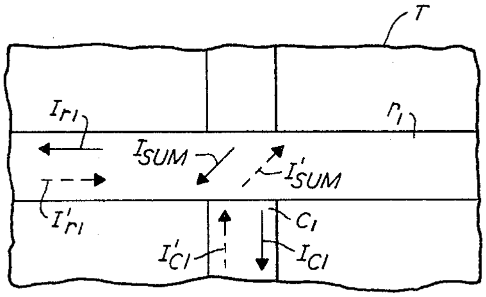

A binary "0" is stored in bit location $BL_{11}$ by applying two negative half-select pulses to row and column conductors $r_1$ and $c_1$. The half-select pulses again are applied by row drive pulse source 11 and column drive pulse source 13 under the control of control circuit 16. Negative half-select pulses are taken as directed toward the pulse sources as shown by the arrows $I_{r1}$ and $I_{c1}$ in FIGURE 5. The resulting negative full-select pulse $I_{sum}$, also termed a write "0" pulse, can be seen to be directed downward and to the left as shown in the figure. This direction is opposite to that shown for the positive write "1" pulse in FIG. 3. The opposing supercurrents are shown by the broken arrows designated $I'_{r1}$, $I'_{c1}$, and $I'_{sum}$.

Figure 6:
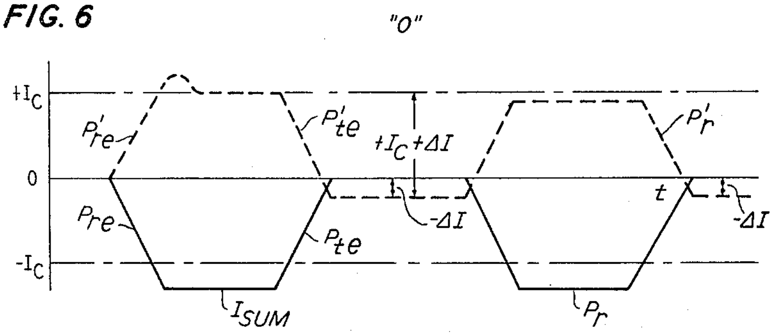

FIG. 6 illustrates the changes produced by a write "0" pulse. The figure shows a negative-going rising edge $P_{re}$ to the write "0" pulse and a positive-going rising edge $P'_{re}$ to the opposing supercurrent pulse. There is a direct correspondence between FIG. 6 and FIG. 4. In the latter, however, the write "0" pulse $I_{sum}$ is negative rather than positive as shown for the write "1" pulse in FIG. 4. In view of this correspondence, it is sufficient to say that at the termination of the trailing edge $P'_{te}$, the resulting persistent currents are circulating in a negative direction. The negative direction is desinated the second direction herein. Again these persistent currents have a magnitude of approximately $\Delta I$ as is indicated in the figure.

To recapitulate, a binary "1" is stored in a bit location of a superconductive memory by two positive half-select which correspond to persistent currents in a first direction. A binary "Q" is stored by two negative half-select pulses which correspond to persistent currents in a second direction. Since this embodiment concerns a coincident-current memory wherein storage of information is on a bit-organized basis, it is sufficient to illustrate the storage of a binary "1" and a binary "0" in a representative bit location to illustrate the operation of the entire memory particularly in view of the fact that all bit locations therein store information alike.

Such is also the case with the read operation which is now discussed for reading a "1" or a "0" out of the representative bit location $BL_{11}$. In accordance with this invention, read out of bit location $BL_{11}$ is accomplished by applying a negative pulse to each of row conductor $r_1$ and column conductor $c_1$. Again, these pulses are applied simultaneously by the activation of row drive pulse source 11 and column drive pulse source 13 under the control of control circuit 16. These pulses are selected of an amplitude to produce a negative read pulse, designated $P_r$ in FIGS. 4 and 6, which is sufficient to drive the superconducting material resistive only when a binary "1" is stored there and not when a binary "0" is stored there. In this manner, flux changes between the memory plane and the sense plane occur only when a binary "1" is stored in the selected bit location. The read pulse, accordingly, is limited in amplitude to a value between $+I_c-\Delta I$ and $+I_c+\Delta I$ as shown in FIGS. 4 and 6. For a binary "1" stored in the representative bit location $BL_{11}$, the read pulse switches the persistent currents there from the positive to the negative direction as shown in FIG. 4, and a positive unipolar pulse is detected by voltage pulse detector 15. For a binary "0" stored in the representative bit location $BL_{11}$, the read pulse does not switch the direction of the persistent currents as shown in FIG. 6, and no output pulse is detected by the voltage pulse detector 15.

Figure 7:
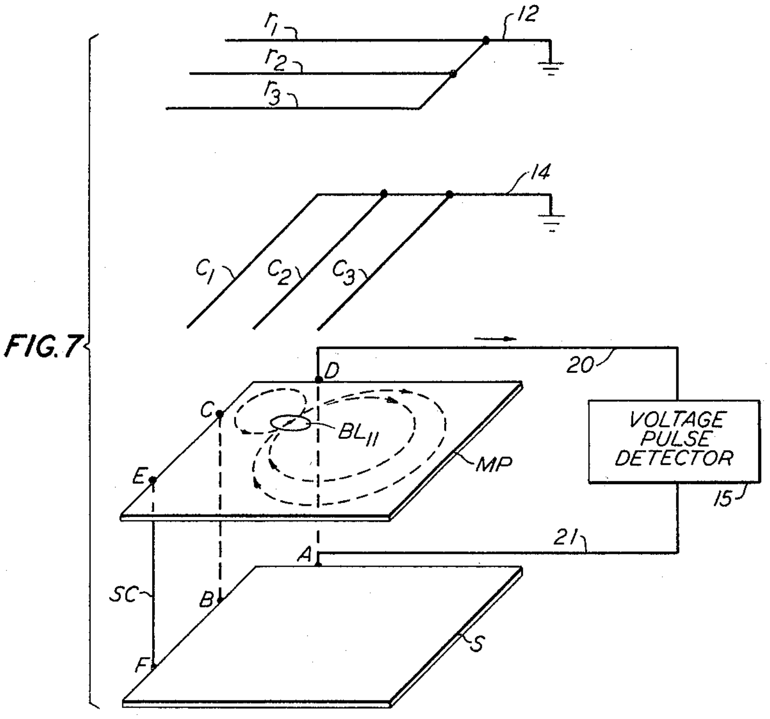
FIG. 7 is an exploded plan view of a portion of the memory of FIG. 1.
Figure 8:
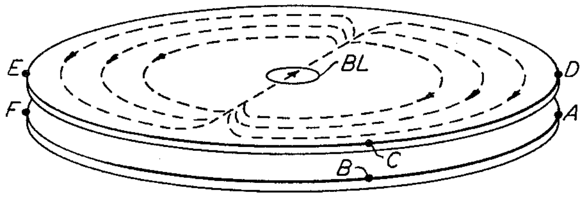
FIGS. 8 and 9 are top and cross-sectional views, respectively, of an imaginary bit location useful in explaining the operation of a bit location in the memory plane shown in FIG. 1, showing the current and flux patterns in and about the memory plane.
Figure 9:
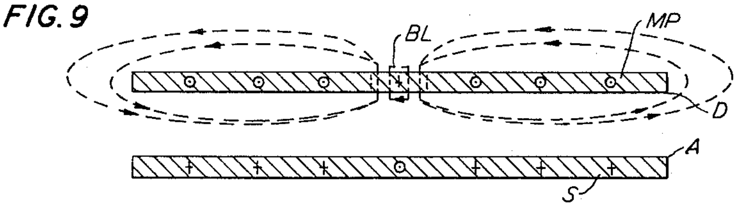

The origin of the output pulse detected by voltage pulse detector 15 during the read out of a binary "1" in representative bit location $BL_{11}$ can be understood most easily in connection with FIGS. 7, 8, and 9. FIG. 7 shows an exploded plan view of the memory of FIG. 1 omitting, for clarity, the insulating layers and the drive pulse sources shown in FIGS. 1 and 2. The superconducting sense plane S, in close proximity to the memory plane MP, changes the considerations for determining the current distribution for the minimum energy in the memory plane. Specifically, the persistent currents, rather than circulating relatively closely in the neighborhood of the bit location as they would to provide a minimum energy for prior art superconductive memory arrangements, now circulate over the entire surface of the memory plane to provide a minimum energy for the new geometry in accordance with this invention. This current distribution is shown in FIG. 7 by the broken closed-curve arrows in the memory plane MP. For a binary "1" the persistent currents in the bit location are directed upward and to the right circulating throughout the memory plane as shown in FIG. 7.

These persistent currents are accompanied by a magnetic field which closes, primarily, through the resistive portions in bit location $BL_{11}$ and about the periphery of the memory plane in a manner consistent with that shown by the broken closed-curve arrows in FIG. 9 which will be described more fully hereinafter. This path comprises the lowest reluctance path available for closure of the flux associated with the currents distributed throughout the memory plane. When the direction of the persistent currents is switched, the direction of flux in the associated magnetic field is switched producing a voltage difference between the memory plane and the sense plane, as will become apparent from the mathematical explanation in connection with the proposed model to follow. This voltage difference is detected between a point on the periphery of the memory plane and the corresponding point on the periphery of the sense plane and provides a current in conductors 20 and 21 which is a function of that voltage difference and the impedance of the utilization circuit.

In reading out a binary "0," the persistent currents are not switched and, essentially, no resistive portion is provided in the selected bit location during read out. Consequently, no flux is switched between the memory plane and the sense plane, and no output pulse is detected by voltage detector 15.

The origin of the output pulse in reading out a binary "1" in accordance with this invention can be understood, further, by considering a proposed model including an imaginary single bit location BL centrally located on a circular superconducting memory plane and a similarly shaped superconducting sense plane just below it. Such an arrangement is shown in FIG. 8. For the purposes of this analysis, the circulating currents in the imaginary bit location are taken as directed upward and to the right in the bit location as shown by the arrow. The extent of the resistive portions of the bit location during switching of the currents therein is limited to rather small portions of the memory plane encompassed by the imaginary circular portion (not a hole boundary) assumed to correspond to the boundary of the bit location designated BL. The memory plane including the imaginary single bit location, and the sense plane are shown in cross section in FIG. 9. In the portion BL, current is directed into the paper as indicated by the cross. The circles with the dots in them indicate current directed out of the paper. In accordance with the right-hand rule, the magnetic flux due to these circulating persistent currents is directed counterclockwise (clockwise in the portion BL) as shown by the broken closed-curve arrows about the memory plane in FIG. 9; useful flux closure is about the periphery of the memory plane and through the resistive portions of the bit location. This magnetic field generates mirror image supercurrents in the surface of the sense plane to prevent penetration of the sense plane by the magnetic field. These supercurrents are illustrated by the crosses and circles with dots in them, in the sense plane S of FIG. 9. In opposing changes in the magnetic field, these mirror image supercurrents guide the flux into the path about the periphery of the memory plane as shown in FIG. 9.

Mathematically, the rate of flux change through air about the periphery of this memory plane through an imaginary surface ABCDA between the periphery of the memory plane and that of the sense plane can be represented by the surface integral $$\int_s \frac{\partial \overline{B}}{\partial t} \cdot d\overline{A} \quad (1)$$

where $\overline{B}$ is the magnetic flux vector and $d\overline{A}$ is the differential element of area vector on the surface. If current is changing directions in the memory plane, which is the case when a "1" is read out, then $$\int_s \frac{\partial \overline{B}}{\partial t} \cdot d\overline{A} \neq 0 \quad (2)$$

According to Maxwell, however, the line integral $$\oint \overline{E} \cdot d\overline{l} = -\int_s \frac{\partial \overline{B}}{\partial t} \cdot d\overline{A} \quad (3)$$

where $\overline{E}$ is the electric field vector and $d\overline{l}$ is the differential element of length vector about the periphery of the imaginary surface. In the superconducting material, $\overline{E}$ is zero as is well known. Accordingly, $\overline{E}$ can be nonzero only in one or both of the imaginary periphery segments DA and CB of the imaginary surface ABCDA. If C is chosen as a null point, a choice made possible because of the symmetry of the current flow in the circular memory plane, then the voltage between C and B is zero and the voltage of Equation 3 appears between the two selected points D and A. Similar equations for the imaginary surface BFECB reveal that a voltage of opposite polarity appears between the point E on the periphery of the memory plane and the corresponding point F on the periphery of the sense plane. The conductor, SC of FIGS. 1 and 7, connected across these last mentioned two points E and F, provides a short circuit thereacross completing a closed current path about the periphery through points ABFECDA. Accordingly, the current flowing between points D and A also flows between points F and E. The voltage pulse detector 15 of FIGS. 1 and 7 is connected between points D and A as has been illustrated hereinbefore. In this instance, the voltage of Equation 3 and a voltage from the like equation for the surface BFECB may be understood collectively as the voltage induced about the path ABFECDA by a change in the magnetic flux therewithin, that is, the change in the flux through the imaginary surface ABFECDA linking the path thereabout.

In the absence of this short circuit, the voltage of Equation 3 causes a current to flow in the voltage pulse detector which current produces a separation of charges between the memory plane and the sense plane. Removal of this voltage allows the charge to leak back through the voltage pulse detector 15.

The above analysis can be seen to apply to each bit location in the memory plane during the read out of a binary "1" only. Since, in practice, each bit location is positioned differently in a memory plane, the above symmetry considerations vary slightly for each bit. As a result, the voltage pulse detector 15 of FIG. 1 is connected to the memory plane and the sense plane at points which are chosen to optimize the amplitude of the output pulse regardless of which bit location in the memory is read out.

It may be realized that, in accordance with this invention, the distance between the periphery of the memory plane and the voltage pulse detector is significantly shorter than the distance between a coupled portion of a threaded prior art sense conductor and the output circuit there. Accordingly, the delay characteristics of a memory, in accordance with this invention, are significantly improved over those of the prior art. Thus, the problems of the prior art are substantially reduced, and the objects of this invention are realized.

Figure 10:
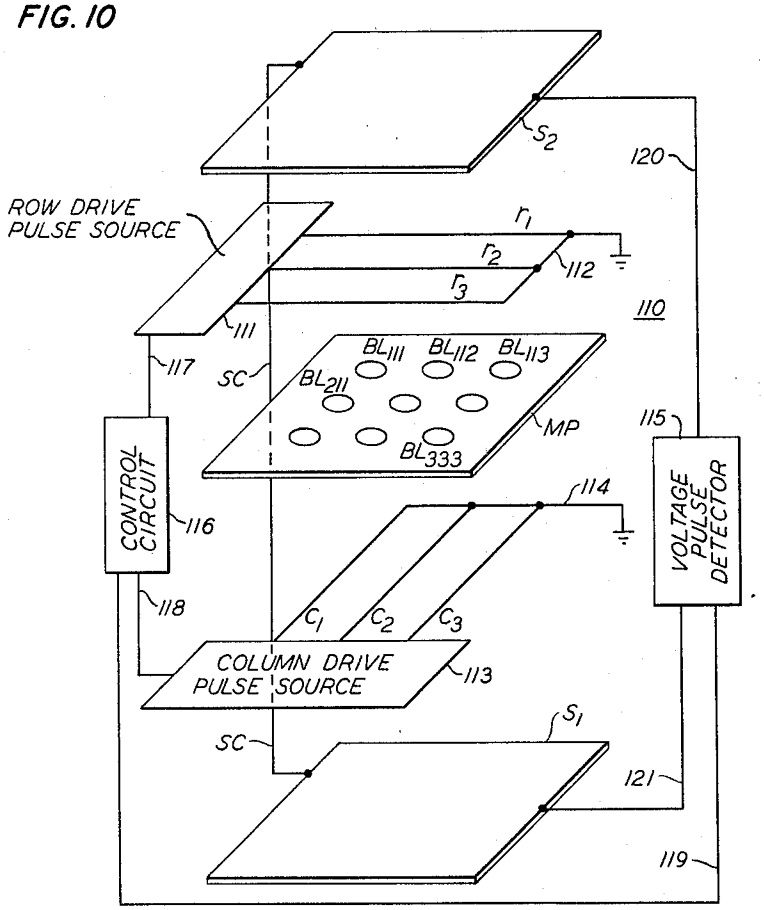
FIG. 10 is an exploded view of a ferromagnetic thin-film memory in accordance with this invention.

A similar sensing arrangement, in accordance with this invention, enables corresponding advantages in connection with various other open-flux magnetic structures as was stated hereinbefore. FIG. 10 shows an exploded plan view of one such memory employing a thin-film magnetic memory plane of the type described, for example, in the Proceedings of the I.R.E., January 1961, page 118 et seq., in an article by J. A. Rajchman, entitled, "Computer Memories—A Survey of the State-of-the-Art." The memory is arranged substantially as shown in FIG. 1 and corresponding reference designations are employed in connection with FIG. 10 to emphasize the similarities between the two memories. The primary differences therebetween are that a magnetic memory plane is utilized in this embodiment, two sense planes $S_1$ and $S_2$ are employed, and the voltage pulse detector 115 is connected between the two sense planes as shown in FIG. 10. In addition, the two sense planes are of normally conducting material such as copper. The insulating material separating the sense planes, the drive conductors, and the memory plane in the manner of FIG. 2 are omitted for clarity. Specifically, FIG. 10 shows an exploded view of a bit-organized, coincident-current, thin-film magnetic memory 110, including a thin-film magnetic memory plane MP. The memory plane includes discrete magnetic films deposited on, for example, a glass substrate, for defining bit locations $BL_{111}$, . . . $BL_{133}$. A continuous film, however, can be used in accordance with this invention. Access to the memory plane MP is via row conductors $r_1$, $r_2$, and $r_3$, and column conductors $c_1$, $c_2$, and $c_3$. Each of the row conductors is connected between row drive pulse source 111 and ground bus 112. Similarly, each of the column conductors is connected between column drive pulse source 113 and ground bus 114. The row and column conductors are shown, illustratively, as generally orthogonal to each other, different pairs intersecting at corresponding bit locations. Nine bit locations are shown, illustratively. Sense planes $S_1$ and $S_2$ are positioned on opposite sides of the memory plane, each separated, illustratively, therefrom by one set of access conductors. As shown, $S_1$ is separated from the memory plane by the column conductors, $S_2$ by the row conductors. A voltage pulse detector 115 is connected to the sense planes $S_1$ and $S_2$ via conductors 120 and 121, respectively. An electrical conductor SC is connected between the sense planes $S_1$ and $S_2$ at a position spaced apart from that to which the voltage pulse detector 115 is connected, providing a short circuit there. Row drive pulse source 111, column drive pulse source 113, and voltage pulse detector 115 are connected to control circuit 116 via conductors 117, 118, and 119, respectively. The drive pulse sources and the control circuit may be any pulse sources and control circuit capable of performing as required in accordance with this invention. The write and read-out pulses are applied substantially as discussed hereinbefore and are consistent with well known magnetic thin-film memory operation. Accordingly, a discussion thereof is omitted in connection with this embodiment. The origin of the sense signal, however, although entirely analogous to that described hereinbefore, differs in certain considerations which permit variations and, accordingly, is described in some detail.

The selected thin-film memory plane of FIG. 10 employs, illustratively, rotational switching of flux between two stable magnetic states as is well known. In the presence of normally conducting sensing planes $S_1$ and $S_2$ of FIG. 10, flux initially circulates over the surface of the memory plane being guided by the sense planes, in the manner described hereinbefore, about the periphery of the memory and through the selected bit location. The flux, however, quickly decays to a pattern in the neighborhood of the bit location through the normally conducting sense planes there. This arrangement is shown in FIG. 11 which is similar to FIG. 9.

Figure 11:
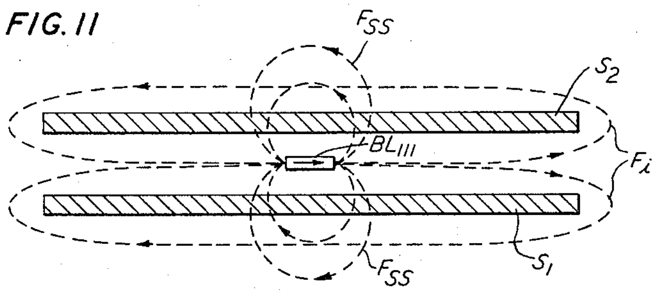
FIG. 11 is a cross-sectional view of a representative bit location of the memory plane shown in FIG. 10, showing the sense planes and the flux patterns thereabout.

FIG. 11 shows the sense planes $S_1$ and $S_2$ and a bit location $BL_{111}$. The flux switched therein initially finds closure about the periphery of the sense planes as shown with broken closed-curve arrows designated $F_I$. The steady state pattern of the lines of flux is through the sense planes at the selected bit location as shown by the broken closed curve arrows designated $F_{SS}$. The output signal is realized, in response to the rotation of the direction of flux in the selected bit location in, essentially, the manner described in connection with the described superconductive embodiment.

In each of the sense planes, at the points therein corresponding to a selected bit location in the memory plane, eddy currents are generated in response to the changing magnetic field described and flow continuously over the surfaces of the sense planes. Because these eddy currents flow, the sense planes act as flux guides in the manner described in connection with the superconducting embodiment. These eddy currents are well understood in the art and do not change, in any way, the origin of the sense signal as described in connection with the superconducting embodiment described hereinbefore. Both a destructive and a nondestructive mode of operation of a magnetic memory in accordance with this invention can be realized, however, by selecting the duration of the drive pulses shorter and longer, respectively, than the eddy current decay time. It is consistent with prior art teaching that the eddy current decay time here is a function of the resistivity and thickness of the sense planes.

Magnetic memories utilizing continuous thin-film memory planes may be made to operate, in accordance with this invention, employing only one normally conducting sense plane. In such a memory the surface resistivity of the sense plane is chosen about equal to the resistivity of the memory plane. A memory of this type is analogous to that shown in and discussed in connection with FIGS. 1 and 2.

It may be seen from the foregoing that each of various embodiments in accordance with this invention includes a pair of adjacent planes which act as a guide for magnetic flux therebetween. In the superconducting embodiment, the superconducting memory plane acts also as a means for selectively introducing flux between the planes of the flux guide as well as one of the guiding planes. As was seen in the magnetic thin-film embodiment, normally conducting planes also can function as flux guides because continuously flowing eddy currents arise therein in response to changing magnetic fields therebetween. In such cases the flux pattern changes as the induced eddy currents decay. A magnetic memory plane composed of discrete bit locations, as described, cannot serve as one of the flux guiding planes because such a plane does not permit the eddy currents to flow continuously over its surface. A continuous magnetic thin-film memory plane, however, does permit the eddy currents to flow continuously thereover and, accordingly, may serve as one of the flux guiding planes.

No effort has been made to exhaust the possible embodiments of this invention. It will be understood that the embodiments described are merely illustrative of the invention and various modifications may be made therein without departing from the scope and spirit of the invention.

What is claimed is:

1. An information storage circuit including an open-flux memory plane of material having first and second stable magnetic states, means including row and column conductors coupled to said memory plane for selectively storing in bit locations of said memory plane information as said first and second stable states, a normally conducting sense plane adjacent each side of said memory plane, means coupled to said memory plane for selectively driving said bit locations to said second stable state, and output means connected between said sense planes at a first position for detecting an output pulse when a selected bit location is switched from said first to said second stable state.

2. An information storage circuit in accordance with claim 1, wherein said row and column conductors are positioned on opposite sides of said memory plane.

3. An information storage circuit in accordance with claim 2, wherein said row conductors and said column conductors are positioned between a sense plane and the memory plane.

4. An information storage circuit in accordance with claim 3 wherein said sense planes are connected together by an electrical conductor at a second position spaced apart from said first position providing, essentially, a short circuit there.

5. In combination, an information storage circuit including an open-flux memory plane comprising a thin film of a magnetic material having first and second stable magnetic states, means including row and column conductors coupled to said memory plane for storing in a bit location of said memory plane information as said first and second stable states, and a normally conducting sense plane adjacent said memory plane, said sense plane being separated from said memory plane by electrically insulating material and a voltage detector connected between said memory and sense planes.

References Cited

UNITED STATES PATENTS

| | | | |
|---|---|---|---|
| 3,172,084 | 3/1965 | Alphonse | 340—173.1 |
| 3,195,115 | 7/1965 | Bradley | 340—174 |

OTHER REFERENCES

Burns, L. L. et al., "A Large Capacity Cryoelectric Memory with Cavity Sensing," Proc. WJCC, 1963 p. 91.

Burns L. L. et al. "Coincident Current Superconductive Memory," Large Capacity Memory Techniques for Computing Systems, MacMillan Co., New York, N.Y., 1962 p. 421.

BERNARD KONICK, *Primary Examiner.*

J. F. BREIMAYER, *Assistant Examiner.*